May 7, 1940.   S. GUARNASCHELLI   2,200,082
CONNECTOR
Filed Feb. 11, 1939
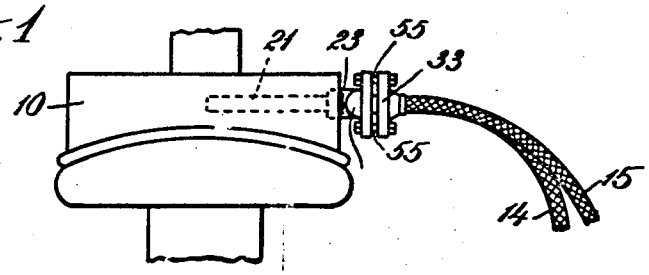
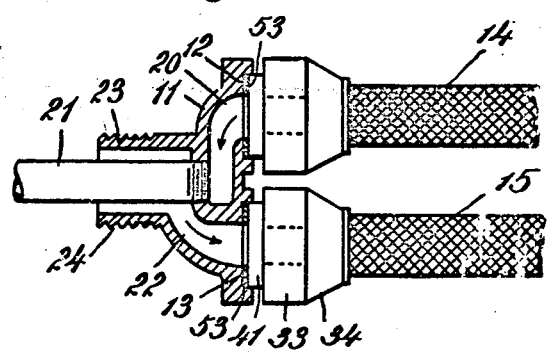
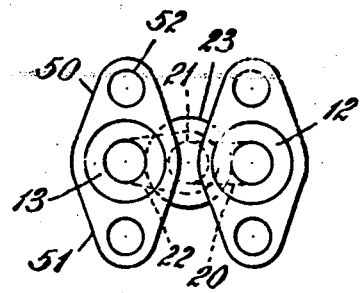
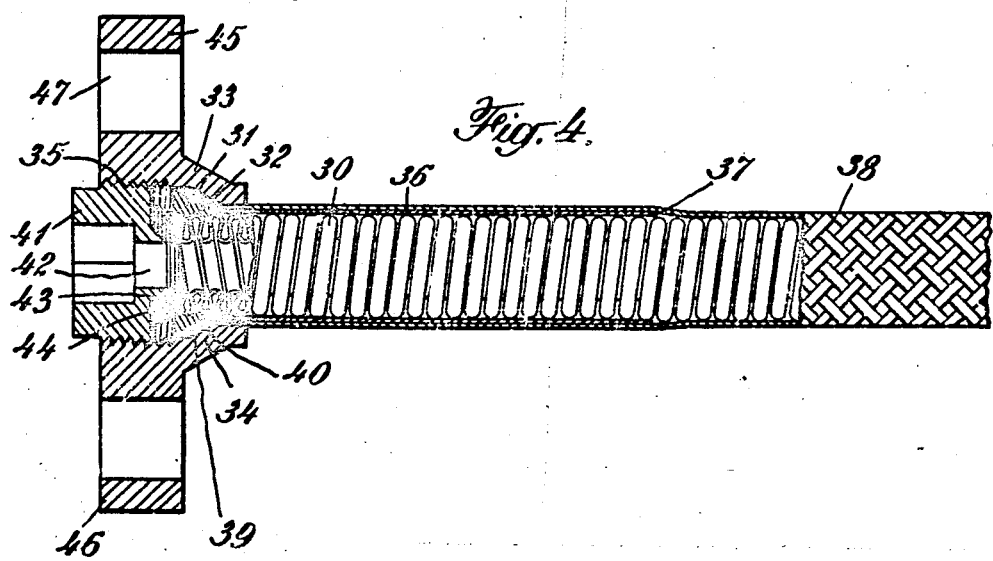
INVENTOR
Stephen Guarnaschelli
BY
Marshall & Hawley
ATTORNEYS Patented May 7, 1940

2,200,082

UNITED STATES PATENT OFFICE 2,200,082

CONNECTOR

Stephen Guarnaschelli, Elmhurst, N. Y., assignor to Packless Metal Products Corporation, New York, N. Y., a corporation of New York Application February 11, 1939, Serial No. 255,794

1 Claim. (Cl. 285—18)

This invention relates to a connector or coupling for connecting hose to a steam buck of a pressing machine. More particularly stated, the invention relates to a connector for connecting a steam hose and return hose to a pressing buck.

The invention has for its salient object to provide a simple, practical and efficient connector that can be easily applied and will be tight and free from leaks.

Another object of the invention is to provide a coupling between a connector of the type specified and flexible hose so constructed and arranged that the hose can be easily and quickly connected or coupled, and when so connected will not leak.

Further objects of the invention will appear from the following specification taken in connection with the drawing which forms a part of this application and in which Fig. 1 is an elevational view showing the connector mounted or connected to the steam buck of a pressing machine.

Fig. 2 is an elevational view partly in section showing the connector and a pair of hose links connected thereto.

Fig. 3 is an end elevation of the connector with the hose removed; and

Fig. 4 is an enlarged sectional elevation showing the coupling for connecting the hose sections to the connector.

In the particular embodiment of the invention illustrated the connector is shown in Fig. 1 as secured to or mounted on a steam buck 10 of a pressing machine.

The connector consists of a member or casing 11 having a pair of seats 12 and 13 formed on one end thereof for receiving the inlet hose 14 and the exhaust or outlet hose 15.

The seat 12 communicates with a passage or conduit 20 formed in the casing 11, and the other end of the passage or conduit 20 communicates with a pipe or conduit 21 through which steam is conducted to the steam chamber of the buck 10.

The other seat 13 communicates through a conduit or passage 22 with a conduit or pipe 23 which is threaded as shown at 24, the threaded pipe being threaded into an opening in the buck 10.

It will be noted that the conduits 21 and 23 are concentric, the conduit 21 extending through the conduit 23.

In use the hose 14 is connected to a suitable source of steam supply and the steam passes through the hose into the conduit or passage 20 and through the pipe 21 into the steam buck.

The return steam passes out through the conduit 23, passage 22 and hose 15.

The two hose sections, or pieces 14 and 15, are connected to the member 11 in the following manner:

Fig. 4 illustrates a flexible or spiral hose 30 on the end of which is mounted a split collar 31 having its inner surface corrugated or threaded, as shown at 32. The split collar is compressed on the end portion of the hose 30 at a point spaced from the end and is surrounded by a sleeve 33 having an inwardly extending tapered portion 34 and having a threaded portion 35.

The flexible hose 30 is surrounded adjacent its end by a flexible sheath 36 which extends a suitable distance from the end, such as the point 37, and the remaining portion of the hose as well as the sheath 36 is surrounded by a flexible sheath 38, such as the braided sheath illustrated. The ends of the sheaths 36 and 38 extend into the sleeve 33 and are clamped between the conical near surface 39 of the sleeve and the conical outer surface 40 of the split collar 31.

The flexible hose 30 is coupled to the sleeve by means of a plug 41 which is threaded into the threaded opening or threaded portion 35 and is provided with a central opening 42 and a conical seat 43. The plug 41 is screwed into the sleeve and the conical seat 43 engages the end of the flexible hose and compresses the end portion extending beyond the collar 31 into a compact solid mass, as shown at 44. The conical seat 43 thus forms a correspondingly shaped seat in the end of the hose and as the plug is screwed in the split collar 31 tightly grips the flexible hose and also is forced into tight or close engagement with the ends of the sheaths 36 and 38.

The sleeve 33 is provided with flanges 45 and 46 which in turn are provided with bolt openings 47.

The member 11 is also provided with corresponding flanges 50 and 51 having bolt openings 52. These correspond in size and shape with the flanges 45 and 46, and the bolt openings 47 are adapted to be alined with the openings 52.

After the hose sections have been secured to the sleeve 33, washers 53 are placed on the seats 12 and 13 and the flanges on the member 11 and on the sleeves 33 are properly lined up and bolts 55 are passed through the openings and nuts are screwed thereon to securely clamp the hose sections to the connector.

From the foregoing description it will be evident that a simple and practical connector has been designed and that the connector can be easily and quickly secured in position and when so secured will be tight and will not leak.

Although one specific embodiment of the invention has been particularly shown and described it will be understood that the invention is capable of modification and that changes in the construction and in the arrangement of the various parts may be made without departing from the spirit or scope of the invention as expressed in the following claim.

What I claim is:

A coupling for connecting parallel flexible pipes to a pair of concentric pipes, said coupling comprising a casing having at one end a pair of flange elements having seats for receiving the ends of the flexible pipes and having a portion at the opposite end provided with means for securing the concentric pipes thereto, said casing having a passage leading from one seat to the inner concentric pipe and a passage from the other seat to the outer concentric pipe.

STEPHEN GUARNASCHELLI.